United States Patent Office 3,422,157
Patented Jan. 14, 1969

3,422,157
PROCESS FOR CONTINUOUS ALKYLATION OF ARYLHYDROXIDES USING ION EXCHANGE RESINS
Stephen Kaufman, East Brunswick, and Richard E. Nicolson, Martinsville, N.J., assignors to Union Carbide Corporation, a corporation of New York
Continuation of application Ser. No. 120,752, June 29, 1961. This application Apr. 18, 1966, Ser. No. 545,520
U.S. Cl. 260—624   8 Claims
Int. Cl. C07b 27/00

This application is a continuation of our earlier filed application Ser. No. 120,752, filed June 29, 1961, now abandoned, which was a continuation-in-part of our application Ser. No. 62,122, filed Oct. 12, 1960, also abandoned.

This invention relates to continuous process for alkylating arylhydroxides. More particularly, the invention relates to continuous process for reacting olefins with arylhydroxides in contact with a cation exchanging resin.

It is known to alkylate arylhydroxides such as phenol by reacting together olefins and phenol in the presence of soluble acidic catalysts such as strong mineral acids, e.g., sulfuric acid and hydrochloric acid, or Lewis acids, such as boron trifluoride and aluminum trichloride. Numerous disadvantages result directly from the use of the soluble acidic catalyst in such processes. For example, acid corrosion resistant equipment is essential, neutralization and catalyst removal procedures complicate product recovery, and frequently the phenol and olefin reactants are degraded by contact with the strong acids.

The cation exchanging resins are insoluble acidic materials which are free of the above drawbacks. Cation exchanging resins have been used as catalysts experimentally in the alkylation of arylhydroxides with pure olefins. The batch alkylations heretofore disclosed, however, are too slow, being on the order of 7–24 hours, to be useful on a commercial scale for the alkylation of arylhydroxides. Further, vigorous agitation of the catalyst particles is required and this causes undue attrition of the catalyst which negatives to a certain extent the advantage of reusability, characteristic of ion exchange resins.

While the use of cation exchanging resins even in batch reactions is undoubtedly advantageous over soluble acid processes for alkylation of arylhydroxides, batch reactions in general are unsatisfactory for commercial exploitation because of uneconomical process times, poor equipment utilization and a lack of batch-to-batch product uniformity. The translation of small quantity batch reactions to a commercial scale introduces a problem of temperature control in the reaction vessel. As vessel size is increased, more vigorous agitation is necessary for adequate temperature control and increased catalyst attrition results. Also the great volume of catalyst used in commercial size batch processing is difficult to filter and handle in product separation procedures.

It has been proposed to use a fixed bed of cation exchanging resin, for example, a packed tower, to circumvent the difficulties of product separation and catalyst attrition. Attempts to make practical use of such proposals by producing alkylated hydroxyaryl compounds using a fixed bed of cation exchanging resin have proven unsuccessful heretofore, primarily because of two opposed factors:

The first factor is process economy. Rapid reaction rates are necessary to make the continuous alkylation of arylhydroxides commercially feasible. More rapid reaction rates, as are achieved, for example, by the use of pressure in the reaction vessel, mean increased production of heat during the reaction.

The second factor is temperature control. Alkylation of arylhydroxides is extremely exothermic. Continuous, rapid alkylation exacerbates this exothermicity. Bearing in mind that presently known cation exchanging resins are desirably not used at temperatures above about 150° C., it is obvious that an alkylation reaction as, for example, that between phenol and isobutylene which liberates enough heat to raise the temperature of the reaction mass 235° C., poses acute reaction zone temperature control problems. Also, temperatures above about 150° C. can cause decomposition of the product, particularly in an acid environment and thus lower yields.

Factors one and two thus pose contradictory considerations. Efforts to increase reaction rate to a commercially suitable level also and invariably result in increased evolution of heat. Cation exchanging resins on the other hand are sensitive to temperatures above about 150° C., and if the evolved heat is not rapidly removed from the reaction zone catalyst degradation will result, making the process uneconomical and commercially unsatisfactory.

Thus far untapped sources for raw materials for alkylation reaction are the gas streams of hydrocarbon cracking operations. These streams, consisting variously of predominately $C_3$, $C_4$, $C_5$ and higher hydrocarbons, are usually burned despite their valuable olefin content, because an economical means of separating the desired olefins from the remainder of the stream is not presently known. For example, there exists in the usual $C_4$ hydrocarbon stream which is vented from butadiene absorbers a substantial concentration of n-butene as well as isobutylene, both highly useful compounds when segregated.

It is an object of the present invention to provide a rapid and continuous process for alkylating arylhydroxides using cation exchanging resins as the catalyst.

It is another object to provide a rapid and continuous process for alkylating arylhydroxides using cation exchanging resins as a catalyst wherein the temperature of the reaction zone is readily controllable.

It is another object to provide a rapid and continuous process for alkylating arylhydroxides using cation exchanging resins as the catalyst wherein the source of the principal olefin reactant is a mixture of saturated and unsaturated hydrocarbons substantially completely comprising hydrocarbons having the same number of carbon atoms as the principal reactant.

It is another and specific object to provide a rapid and continuous method for alkylating phenol with the isobutylene of $C_4$ hydrocarbons streams to produce para-tert-butyl phenol.

We have now discovered that these and other objects are achieved in general, by the use of a rapidly recirculating stream of reactants, reaction products and reaction by-products to (1) remove the heat of alkylation from the reaction zone and thereby control reaction temperatures and (2) to regulate the reaction rate and composition of the reaction mixture and thereby preferentially react selected components.

In general, the process of this invention comprises continuously adding relatively small amounts of pure or impure olefin reactant and arylhydroxide reactant as liquids to a recirculating reaction stream, contacting the mixture in a reaction zone with a substantially stationary porous mass of cation exchanging resin, alkylating at least a portion of the arylhydroxide present in the reaction zone, carrying the heat of alkylation out of the reaction zone by means of the reaction stream, removing heat of alkylation from the reaction stream in a cooling zone and returning the cooled reaction stream to the reaction zone, and at a point subsequent to the reaction zone continuously withdrawing a relatively small amount from the reaction stream equal in volume to the reactants being added and separating alkylated arylhydroxide therefrom.

The use of a recirculating reaction stream containing reactants, reaction products and reaction by-products to carry heat of alkylation from the reaction zone is a critical feature of our process. By the use of such a system we are able easily to maintain reaction zone temperatures at virtually any desired level by merely increasing or decreasing the reaction stream recirculation rate. Even the tremendous heat of alkylation produced by the reaction of liquefied isobutylene with phenol, can be quickly removed and the reaction zone temperatures readily controlled and, if desired, maintained well below 150° C.

Where the product of the reaction zone is a mixture of alkylated arylhydroxides, e.g., the product of the reaction of pure (i.e. 99%) isobutylene and phenol is a mixture of the ortho- and para-tert-butyl-phenols, dibutyl and tributyl phenols, a portion of the mixture is continuously withdrawn from the recirculating reaction stream and is passed to a conversion zone, suitably comprising a cation exchanging resin, maintained at a temperature conducive to attaining the conversion equilibrium of the reaction products to the desired compound. E.g., para-tert-butylphenol is in equilibrium with the above butyl phenols at about 95% para-butyl-phenol and 5% other butyl phenols.

The present process is useful for alkylating arylhydroxides which have melting points below about 150° C. By the term "arylhydroxide" as used in the present specification and claims is meant monohydroxylated aromatic hydrocarbons, i.e., compounds of carbon and hydrogen that contain an aromatically unsaturated closed ring of carbon atoms and have a single hydroxyl group attached to one of ther ing carbon atoms. The term "arylhydroxide" includes both mononuclear monohydroxylated aromatic hydrocarbons such as phenol and phenols and polynuclear monohydroxylated aromatic hydrocarbons such as napthol and naphthols. These aromatic hydrocarbons can be substituted in one or more positions provided at least one of the ortho or para positions remains unsubstituted in the phenols and a corresponding position remains unsubstituted in the naphthols, i.e., $\alpha$-naphthol having at least one of the 2 and 4 positions unsubstituted and $\beta$-napthol having one or more of the 1,3 and 6 positions unsubstituted. Specific classes of substituents are alkyl, aryl, alkaryl, and aralkyl groups. Among the useful phenols, those deserving a special mention are: phlorols, n-propyl-phenols, o-cumenol, m- and p-hydroxy-cumene, p-tert-butyl-phenol and like phenols; 2,3-dimethylphenol, 2,5-dimethylphenol, 2-ethyl-5-methylphenol, 2-methyl-5-isopropylphenol, 2-propyl-5-methylphenol, 2-isopropyl-5-methylphenol, 2,6 - dimethylphenol, 2 - methyl-6-ethyl-phenol, 2,6-diethylphenol, 2-methyl-6-propylphenol, 3,4-dimethylphenol, 3 - methyl - 4-ethylphenol, 3,5-dimethylphenol, 3,5-diethylphenol and like phenols; also 2,3,5-trimethylphenol and 3,4,5-trimethylphenol and like phenols. Among the useful naphthols, those deserving of special mention are: $\alpha$-naphthol and $\beta$-naphthol. The above enumerated specific arylhydroxides are merely illustrative of certain of the better known phenols and naphthols and are not intended nor should they be construed as exhaustive of suitable arylhydroxides.

The olefins which are useable in this process to alkylate arylhydroxides are olefinically unsaturated aliphatic hydrocarbons having from 2 to 30 carbon atoms and melting points of less than about 150° C. Particularly useful in this process are olefinically unsaturated aliphatic hydrocarbons containing 3 to 12 carbon atoms one of which is a tertiary carbon atom e.g. propylene, isobutylene, isopentene, hexenes, diisobutylene heptenes, nonenes, and dodecenes.

A convenient source of certain of these olefinically unsaturated aliphatic hydrocarbons, which is advantageously employed in one embodiment of this invention, is the gas stream by-product of hydrocarbon cracking processes. In this embodiment an olefin feed stream comprising a mixture of saturated and unsaturated hydrocarbons substantially all of which hydrocarbons have as many or fewer carbon atoms than the desired olefin reactant is employed. Surprisingly, the cation exchanging resin catalyzed reaction of this invention exhibits a high degree of selectivity so that substantially only one component of a mixed hydrocarbon gas stream is reacted with the phenol. For example, a $C_4$ hydrocarbon stream normally contains methane, ethane, propane, propylene, n-butene, isobutane, n-butene-1, cis-butene-2, trans-butene-2, butadiene and methyl acetylene as well as isobutylene. A highly selective reaction of the isobutylene with the phenol occurs, however, with the use of this $C_4$ hydrocarbon stream in the process of this invention so that yields of 90% and above of p-tert-butyl phenol can be easily and rapidly obtained. An important feature of this embodiment of our process is that n-butene, a compound of considerable value in its own right, is readily obtainable as will be more fully explained hereinafter.

Other mixed hydrocarbon streams e.g. $C_3$, $C_5$, $C_8$, $C_9$ and $C_{12}$ also provide selective reaction and are useful in the process of this invention.

We employ cation exchanging resins as solid catalysts in the alkylation process of our invention. These catalysts are insoluble in the reaction mixture and hence the problem of catalyst separation from the reaction zone effluent and the removal of small amounts of catalyst impurities in the product is obviated. Throughout the reaction steps and isolation steps the catalyst remains in the reaction zone and does not appear elsewhere in the process equipment. The catalyst is reusable indefinitely and hence its service life in this process is extremely long. The catalyst does not of necessity have to be regenerated, if care is exercised in preventing the introduction of basic metal ions such as sodium, potassium, calcium, etc., or other contaminants which inactivate the ion exchanging groups of the resin. The use of the insoluble catalyst confers the additional advantages of eliminating the need for acid corrosion resistant equipment which is otherwise essential and making unnecessary the neutralization steps which are common to other processes.

The catalysts used in this invention are strongly acidic cation exchanging resins having chemically bound thereto cation exchanging groups. Suitable exchanging groups are strong acid groups, such as sulfonic acid groups, which exhibit strong exchange potential with cations, such as $Na^+$ and $Ca^{++}$.

The exchange capacity of these cation exchanging resins is determined essentially by the number of acidic groups attached to the polymeric resin skelton per unit weight. However, the catalytic effectiveness of the resin in the present process is only partly determined by its exchange capacity. Equally important is the availability of these cation exchanging groups for contact with the reactants. Therefore, cation exchanging groups are desirably on the surface of the resin mass structure or of the resin beads. It is not necessary that the resin structure be in any particular form, but it is desirable to have the greatest possible surface area on the catalyst to secure exposure of the greatest number of cation exchanging groups to the reactants. The catalyst structure, hence, is advantageously made as fine as practicable without causing an undue pressure drop across the catalyst bed. Suitable, for instance, are microspheres or beads, which provide increased total surface area. Also suitable are porous forms of resin. Where porous resin structures are employed, the pores should be large enough to permit free passage of molecules of the reactant and product. Contact of the reactants with acidic groups within the beads, as by diffusion, is also effective for carrying out the reaction.

The particular polymeric structure to which the cation exchanging groups are attached is not critical in the present process. The structure should be such, however, as renders the polymeric structure substantially insoluble in the reaction mixture and in any organic liquids to which the catalyst might normally be exposed. Cross-linked resins, e.g., 4 to 12% cross-linking, effectively provide the insolubility feature required of these resins and permit diffusion of reactants into the resin structure, although other factors, such as crystallization forces are sometimes powerful enough to insure insolubility without actual cross-linking. Highly successful results are secured with styrene-divinylbenzene sulfonated resins, sulfonated cross-linked styrene polymers, phenolformaldehyde sulfonic acid resins, benzene-formaldehyde sulfonic acid resins and the like. Such resins have been sold and marketed by several companies under various brand names. For instance, Rohm & Haas Company's Amberlite XE–100, a sulfonated styrene-divinylbenzene resin is highly successful in this process, as are other sulfonated ion exchanging resins such as Dow Chemical Company's Dowex–50W and Dowex–50–X, Permutit Company's Permutit QH, and Chemical Process Company's Chempro C–20.

Prior to use in the method of this invention these cation exchanging resins must be in the hydrogen ($H^+$) or acid form. Some of these resins are marketed in the salt form and must be treated before use to convert the ion exchange groups into the acid form. This can be easily effected with sulfuric acid or hydrochloric acid and the like. An excess of acid is generally used. Afterward, the excess acid is washed out with water or suitable solvent to remove the released salts.

In the course of such treatment, water, if employed, disperses within and to some extent swells the resin network. For best results this water should be substantially removed or displaced in order to secure maximum alkylation rate. It is preferable in our process that the catalyst be at least substantially anhydrous, i.e., less than about 5% water by weight. This condition can be achieved by a variety of means, such as by drying the resin in an oven immediately prior to use. During use the resin should be kept out of contact with high moisture content environments.

Removal or displacement of the water to achieve a substantially anhydrous condition can be accomplished in several ways other than or in addition to drying. For example, the water can be displaced by a solvent through distillation or diffusion techniques, or the resin can be dried and then allowed to soak in solvent, e.g., a phenol, until saturated. This forms a very effective catalyst. The use of solvent saturated resins is preferred because the problems of moisture adsorption prior to and during use is obviated and strict control over the reaction environment is unnecessary. Without displacement of most of the water, that is to less than about 5 weight percent, the cation exchanging resins may exhibit lessened catalytic activity. We do not desire to be bound by any particular theory of operation, but it is believed that the water within the framework of the resin catalyst may form an effective shield around the cation exchanging groups attached to the resin structure and retard the catalytic effect of these groups in nonaqueous reaction media. Replacement of this water with a solvent tremendously increases the availability of these cation exchanging groups to such an extent that the resin then becomes a highly effective catalyst for alkylation of arylhydroxides.

The temperature within the reaction zone should be high enough to maintain the reactants in the liquid phase, i.e., melt solid reactants and not vaporize liquid reactants. The use of temperatures which are so high as to cause degradation of the reactants, alkylated arylhydroxide or the cation exchanging resin is to be avoided. The specific temperature employed with a pure olefin reactant can vary from about 30° C. to about 150° C. and more, e.g., up to 200° C. if the cation exchanging resin is not degraded thereby, depending upon the other operating conditions within the reaction zone in addition to the reactants used such as (1) percent conversion per pass which can range from 1% to 100% and is preferably from 50 to 100%, (2) residence time or length of time of contact between catalyst and reactants, (3) amount of pressure, and the like. In order to avoid plugging of the reaction zone with solidified reactants or reaction products, which may occur at temperatures much below 50° C. and in order to achieve reasonable rates of alkylation, temperatures preferably range from about 50° C. to about 125° C.

When alkylating phenol with an impure olefin source, e.g., when alkylating phenol with the isobutylene component of a $C_4$ hydrocarbon gas stream, it is highly desirable, in order to obtain a preferential reaction and a yield of desired product to use temperatures within the range of 50° C to 70° C.

The reaction zone for both pure and impure olefin sources must be at a sufficient pressure to ensure liquid reactants, e.g., 1 to 15 atmospheres. Where the reactants are normally liquid at the reaction temperature atmospheric pressures can be used. In general, however, the use of a slightly elevated pressure is preferred even with normally liquid reactants to ensure adequate flow of materials through the system in continuous operation. Alkylation with reactants which are normally gaseous at the reaction temperature, e.g., isobutylene at 50–70° C. utilizes application of moderate pressures of about 10 to 15 atmospheres. The amount of pressure used is not narrowly critical, the sole requirement being to maintain the reaction zone contents in the liquid phase. It is apparent the reaction zone temperature and pressure must be regulated with reference to one another as well as other process factors to maintain the reactants in the liquid phase and not permit an amount of either solid or gaseous reactants in the reaction zone which will plug up the catalyst mass or reduce reaction rates to unacceptable levels because of slow absorption of gases into the liquid reaction stream.

To initiate the reaction, an olefin reactant, either pure or mixed with reactive and inert diluents, and the arylhydroxide reactant are reduced to the liquid phase either by melting or compressing as required. The reactants are mixed at a point outside the reaction stream recirculation loop and pre-heated, if desired. The mixed reactants, now comprising a make-up stream, are introduced into the recirculating reaction stream at a point ahead of the reaction zone to form a feed stream which is then passed into the reaction zone at a pressure sufficient to maintain flow of the reactants through the reaction zone at suitable recirculation and process rates. After passage through the reaction zone a portion of the reaction stream is withdrawn and reactive and inert hydrocarbons separated therefrom and the portion is passed to the conversion zone wherein the reaction products are converted to the desired isomer, which is segregated. The remainder of the reaction stream is recirculated.

The size and dimensions of the reaction and conversion zones are not critical, provided adequate contact with the cation exchanging resin is obtained. Suitable reaction and conversion zones, for example, are those of enlarged cross sections such as a chamber, tank, autoclave or the like and those of restricted cross-sections such as a tubular zone or a coil and the like. A plurality of either reaction or conversion zones connected for series or parallel flow can be employed within the scope of the invention. Suitably they are equipped with means for preventing entrainment of the catalyst in the effluent.

The effluent from the reaction zone is passed into a reaction stream recirculation loop which comprises the reaction zone, a pump and a cooling zone comprising a heat exchanger of sufficient capacity to remove any undesired heat from the reaction stream. By pumping the reaction stream through the reaction zone and recirculation loop at a sufficient rate, conveniently at a multiple of 2 or more times the feed rate to the loop, heat content of the reaction stream is readily controllable by controlling the temperature rise increment in the reaction zone. The capacity of the heat exchanger is determined by the olefin reactant feed rate, the temperature differential between the coolant in the heat exchanger and the reaction stream, the percentage of olefin conversion and heat of reaction per pound of olefin. No variation in product quality or yield is discernible at various rates of recirculation ranging from as little as twice the feed rate to 50 and more times the feed rate provided the temperature rise increment across the reaction zone is maintained within the desired limits. It is desirable to maintain the feed temperature at a value which ensures good reaction rate; also excessive temperatures within the resin bed are to be avoided, hence a moderate rise in temperature across the bed, e.g., 1° C. to about 20° C. is preferred. The final optimum increment is determined by the closeness of the best feed temperature to the maximum allowable reaction zone temperature and the maximum practical recirculation.

At a point subsequent to the reaction zone, the recirculation loop is tapped for an exit stream whereby an amount of the recirculating reaction stream equivalent to the feed is withdrawn to maintain a material balance in the reaction stream. The withdrawn portion is treated to isolate the product in any desired conventional manner, depending upon the physical properties thereof. Where a mixed hydrocarbon stream is the olefin source, the alkylated arylhydroxide is first separated from the unreacted hydrocarbon stream components by passing the mixture withdrawn from the circulating loop through a pressure reducing valve and separating these components by evaporation, if these are gases at atmospheric pressure, or by pressurized fractionation or by atmospheric fractionation, if heavy liquids. The alkyl phenol product is thus separated from the major part of the other hydrocarbon stream components. It is necessary with some olefins to further process the withdrawn portion either to complete alkylation or to convert the product to predominantly a single isomeric form. This conversion or alkylation completion is conveniently accomplished in a second stage reaction zone. This zone is also composed of a porous mass of cation exchanging resin and is in other respects similar to the first stage reaction zone except that, due to the slower rate of conversion reaction as compared with the alkylation reaction the second reaction zone should be at least as large as the first stage reaction zone and is preferably larger.

The portion of the reaction stream to be fed to the second stage reaction zone can be withdrawn from the main body of the recirculating reaction stream at almost any point on the recirculation loop. The choice of the particular point will depend largely on the function of the second stage reaction zone. If its function is to complete alkylation with resultant creation of heat, it is desirable to tap the recirculation loop at a point just beyond the heat exchanger to feed cooled reaction stream to the second stage reaction zone. If, on the other hand, the function of the second stage reaction zone is to accomplish an endothermic reaction, e.g., conversion of dibutyl and tributyl phenol and the ortho isomer of tert-butyl-phenol to para-tert-butyl phenol, tapping the loop ahead of the heat exchanger makes use of heat already in the system and reduces the amount of heat which must be added to the second stage reaction zone to maintain desirable heat levels therein. After further processing, if any, the desired product is isolated by conventional means such as distillation, crystallization, washing, et cetera.

An important feature of the present process which contributes significantly to the over-all efficiency thereof is the recycling of reaction by-products, e.g., isomers, to the second stage reaction zone to be reintroduced into the stream. Surprisingly, we have found that an equilibrium is thereby maintained between the product and the by-products in the reaction zone so that under steady state reaction conditions, the concentration of by-products in the reaction zone remains substantially constant. Consequently there is no further buildup of by-products and high process efficiencies of 95 percent and above are realized.

In order to more fully set forth our invention for the continuous alkylation of arylhydroxides, two preferred embodiments of our process (1) with a pure olefin reactant and (2) with an impure olefin reactant are given hereinbelow with reference to the attached drawings wherein.

The ensuing descriptions will be directed primarily to the producton of para-tert-butyl phenol using (1) pure (99%) isobutylene and (2) a $C_4$ hydrocarbon stream available from hydrocarbon cracking operations but it is to be stressed that this alkylation reaction, i.e., phenol and isobutylene either pure or as a component of a mixed gas is selected for convenience only and is in no way intended to limit the scope of our invention or restrict its applicability to alkylation of a wide variety of arylhydroxides with any of numerous olefins.

Figure 1:
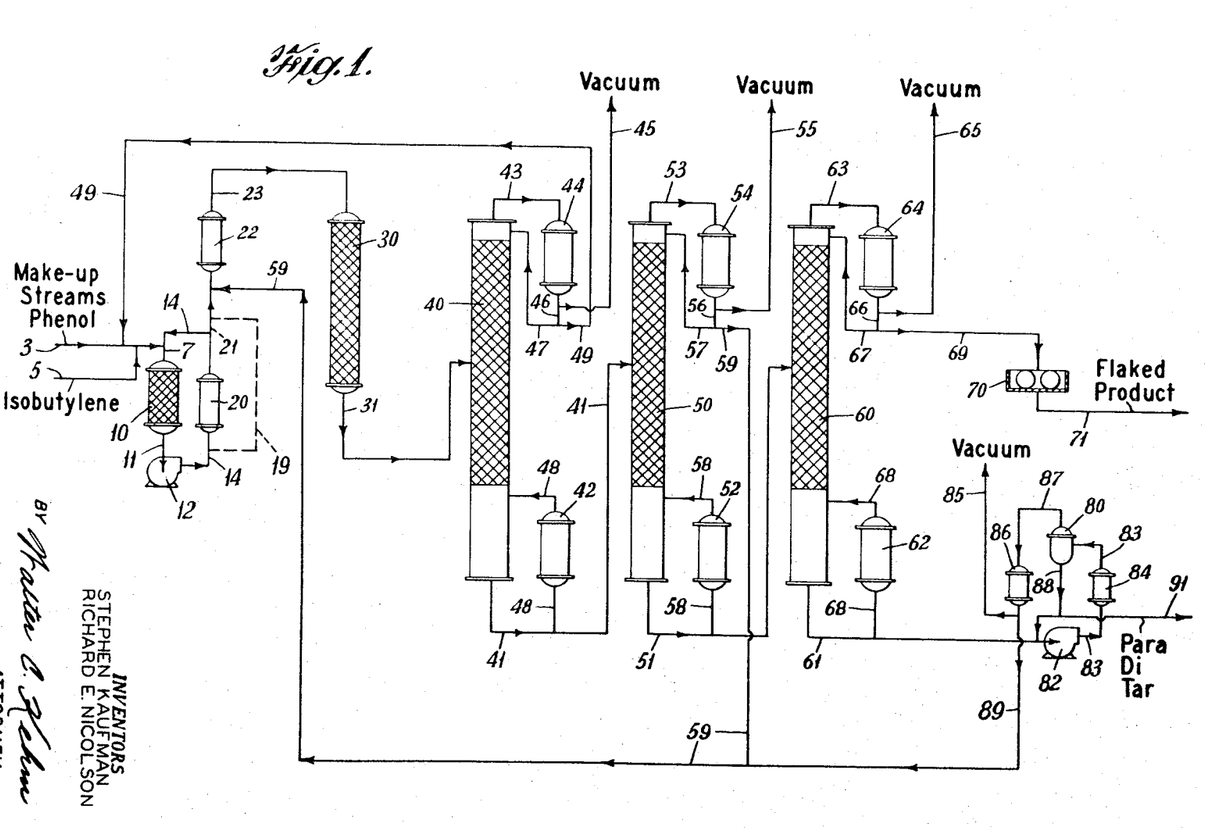
FIG. 1 illustrates one form of apparatus and sequence of processing steps suitable for carrying out the process of this invention using a pure olefin source.

Referring to FIG. 1 in the drawings the reaction zone feed stream is made up at a point ahead of the reactor 10 from: (1) make-up phenol from line 3; (2) make-up isobutylene (99% pure) from line 5; (3) recycled phenol from line 49; and (4) the reaction stream comprising phenol, isobutylene, o- and p-tert-butyl phenol, 2,4-dibutyl phenol and 2,4,6-tributyl phenol recirculating in loop 14. These four streams are blended in such proportions as will maintain a constant feed composition with respect to all components entering the process and also the desired balance of concentrations between the tert-butyl phenols and reaction by-products. The sum concentration of 2,4-dibutyl phenol and 2,4,6-tributyl phenol is preferably maintained at a process equilibrium value of between 20 to 30 weight percent of the feed to the reaction zone. The molar ratio of phenol to isobutylene affects to a certain degree the formation of 2,4-dibutyl phenol. In general, an excess of phenol over equimolar proportions reduces, in proportion to the amount of excess, the formation of 2,4-dibutyl phenol. Phenol to isobutylene molar ratios of from 0.5:1 to about 10:1 are highly suitable when using pure isobutylene. Ratios of from 0.75:1 to 2:1 are preferred and a ratio of 1.4:1 is particularly preferred when operating under the preferred conditions set forth below.

The intermixed streams forming the feed to the reaction zone are brought to a temperature of from 30 to 150° C., preferably from 90°–110° C. and placed under sufficient pressure to liquefy the isobutylene, generally about 100 pounds per square inch gauge at the preferred temperatures given above, and maintained at this temperature and pressure in line 7 leading to the reaction zone. Where normally liquid olefins, e.g., nonenes, are used for alkylation, atmospheric pressures or slightly above can be used.

The reaction zone comprises a reactor 10 which suitably is an elongated chamber provided with a fixed bed of a solvent (preferably the reactant) saturated cation exchanging resin of the type described above. The resin catalyst is disposed in reactor 10 as a porous mass in a manner which permits flow of the feed through the catalyst bed, and also assures adequate contact of the feed with substantially all the catalyst. The catalyst is prevented from becoming entrained in the process stream flowing out of the reactor 10 by a support screen.

The feed passes from line 7 to the top of reactor 10 at a rate of flow such that an "average catalyst factor" defined as $$\frac{\text{dry catalyst (pounds)}}{\text{feed rate (pounds per hour)}}$$

is from 0.06 to 1.0 pound hour per pound or more, preferably about 0.12 pound hour per pound which is sufficient when operating at 90° C. and 100 p.s.i.g. to completely convert isobutylene to a mixture of butyl phenols. As explained above the phenol-isobutylene reaction is highly exothermic. The heat of alkylation is removed from the reaction zone by passing the super-heated reaction stream coming from the reactor 10 as an effluent through line 11 into recirculation loop 14 where circulating pump 12 forces the effluent at a great rate to heat exchanger 20 wherein heat is removed from the recirculating stream and whence the stream is returned to line 7 for blending with fresh reactants and recycled by-products and phenol. The rate of recirculation in loop 14 is widely variable and depends upon the quantity of heat needed to be removed from the reaction stream to maintain a desirable temperature increment in the reaction zone. Generally speaking a recirculation rate which permits less than a 20° C. rise in reaction stream temperature from the top of the outlet of reactor 10 is preferred. Particularly preferred are recirculation rates which control the rise in temperature of the reaction stream to about 10° C. This latter, preferred increment of temperature rise is achieved when operating with a 90–110° C. feed at about 100 p.s.i.g. of phenol and isobutylene in a molar ratio of 1.4:1 by recirculating at a rate approximately 15–25 times the feed rate and preferably at 23 times the feed rate when the average residence time of reactants in contact with the catalyst is about 15 minutes.

The loop 14 is tapped at line 19 just before heat exchanger 20 or at line 21 just beyond heat exchanger 20, depending on whether the heat in the reaction stream will be useful in the second stage reactor. Where para-tert-butyl phenol is being produced, the second stage reactor is a conversion reactor and it is desirable to retain the reaction stream heat; hence the line 14 is tapped at line 19. Where higher olefins are used for the alkylation, the withdrawn reaction stream portion is desirably cooled before passing to the second stage reactor 30 and hence the portion is withdrawn at a point after heat exchanger 20, at line 21. A portion of the recirculating reaction stream equivalent in volume to the feed of fresh phenol and isobutylene and recycled phenol is withdrawn from the recirculation loop through line 21 and is passed toward heater 22 in line 23 prior to being introduced into the second stage reaction zone. The composition of the withdrawn portion is a mixture of product, isomeric and other by-products and reactants. Specifically, when alkylating phenol with isobutylene the composition of the withdrawn portion will generally be para-tert-butyl phenol, ortho-tert-butyl phenol, phenol per se, dibutyl phenol and a small quantity of tributyl phenol. Prior to being passed into the heater 22 material from the product isolation and separation steps comprising mainly tert-butyl phenols other than para-tert-butyl phenol is recycled through line 59 into the portion of the recirculating reaction stream withdrawn from loop 14 to form a product mixture. The product mixture is passed through line 21 to heater 22 to increase the temperature to where formation of para-tert-butyl phenol is favored. Generally, this will be a temperature of between about 110° to 150° C. and preferably 120° to 140° C. The heated mixture passes out of the heater 22 along line 23. This product mixture need not be maintained under superatmospheric pressure in the second stage reaction zone.

The rearrangement or conversion of the alkylation reaction products to para-tert-butyl phenol is carried out in a second stage reaction zone comprising second stage reactor 30 suitably jacketed to maintain internal temperatures at about the temperature of the incoming product mixture. The second stage reactor 30 is similar in design to the first stage reactor 10 and also contains a bed of resin catalyst prepared as described above. The average catalyst factor in the second stage reaction zone is about 1 to 2.0, and preferably about 1.2 pound hours per pound, which is sufficient to convert the major part, i.e., over 50%, of the product mixture to the desired product.

The alkylation reaction started in primary stage reactor 10 can be continued and completed in second stage reactor 30 if desired in this embodiment of the invention, in contrast to the mixed hydrocarbon olefin source embodiment. In order to continue alkylation with isobutylene, it is essential to provide sufficient pressure in second stage reactor 30 to liquefy the normally gaseous olefin. With other olefins, e.g., nonene and triisobutylene, however, greater than atmospheric pressures are not needed. Particularly with the higher molecular weight olefins, it is advantageous to carry out the alkylation in two steps because of greater productivity being achieved thereby.

The higher olefins differ from isobutylene in being slower reacting with arylhydroxides and in achieving equilibrium with lower by-product concentration. These two characteristics can be used to advantage by utilizing the second stage reactor 30 as an alkylation reactor. In this manner, residence time in the primary stage reaction zone is not unduly protracted because only a portion of the alkylation reaction need be carried out therein, preferably from 50 to 75%. The remainder is carried out in the second stage reaction zone. The overall process is not too slow because the amount of the product isomers formed is so small that a separate rearrangement step is unnecessary and total reaction time compares favorably with isobutylene-phenol reactions to para-tert-butyl phenol. Because the higher olefins are liquids, atmospheric pressure or slightly above atmospheric pressures, whichever is sufficient to maintain the system hydraulically full, are suitable. The second stage reactor 30 when being used as an alkylation reactor may be supplied with coolant on the jacket to remove any excess heat of alkylation, rather than steam as when being used as a conversion reactor for butyl phenols.

In the second stage reactor 30 the butyl phenols are substantially converted to para-tert-butyl phenol.

The second stage reactor effluent contains on a phenol-free basis about 90 percent and preferably 95 percent and above of para-tert-butyl phenol, and small percentages of dibutyl phenol and ortho-tert-butyl phenol.

The alkylation and conversion reactions proceed according to the following simplified scheme.

ALKYLATION

CONVERSION

The product separation and recycling steps are the same for the pure and impure olefin source reactions and will therefore be set forth after the description of the alkylation of phenols with a component of a mixed hydrocarbon stream.

It is truly surprising that a mixed hydrocarbon stream such as $C_4$ mixed hydrocarbon stream obtained as vent gas from a butadiene absorber which contains usually varying amounts of at least butene-1
cis-butene-2
trans-butene-2
butadiene
methyl acetylene as well as isobutylene as olefinically unsaturated and hence potentially reactive components that one component, isobutylene should be preferentially catalyzed in its reaction with phenol, so that a selective alkylation of phenol with isobutylene takes place to the near exclusion of competing reactions ranging from other alkylations to homo- and copolymerizations. In addition to reactive components in the $C_4$ gas stream there is present a number of inert diluents such as methane, ethane, and propane.

We have been able to effect the preferential reaction of isobutylene of $C_4$ mixed hydrocarbons by our discovery of a narrow range of molar ratios, reaction temperatures conversion limits and catalyst factors which in combination give p-tert-butyl-phenols from reaction of $C_4$ gases and phenol. These critical values are described in the following description of this embodiment of our process.

Figure 2:
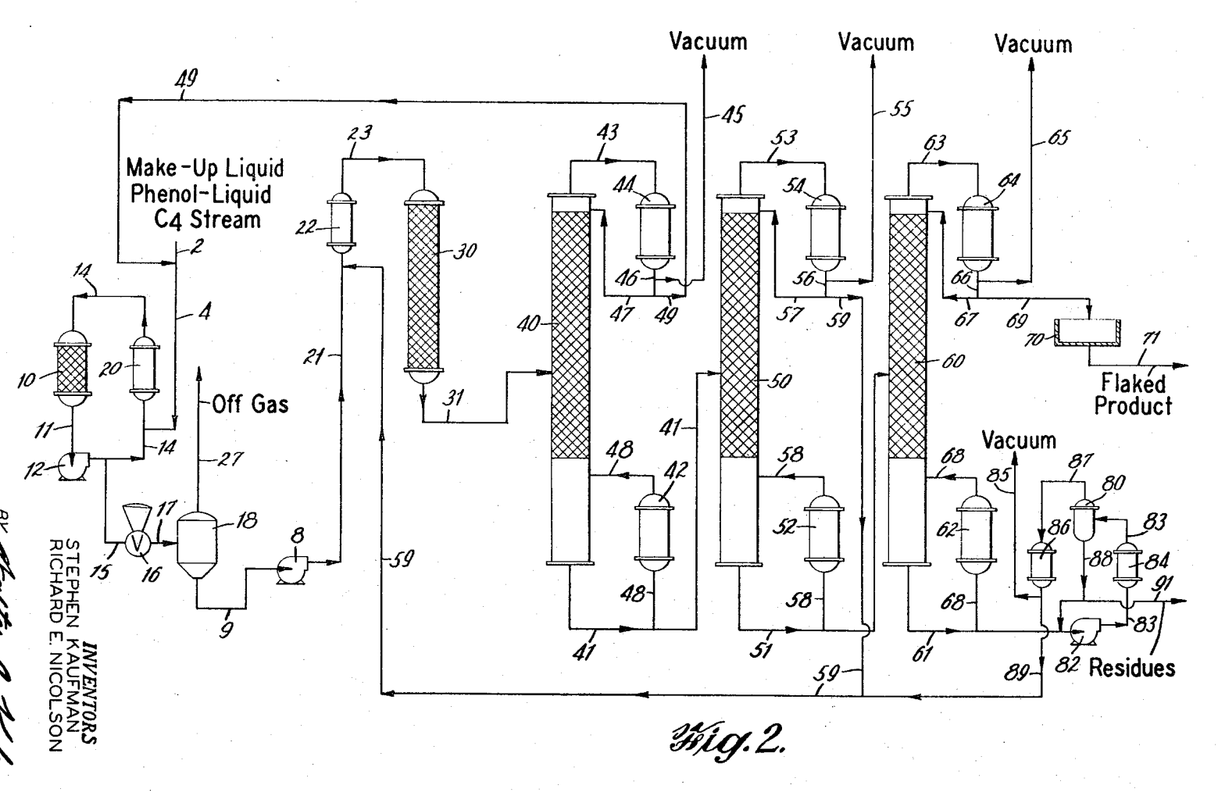
FIG. 2 illustrates another form of apparatus and sequence of processing steps suitable for carrying out the process of this invention using an impure olefin source.

Referring to FIG. 2, the reaction zone feed stream is made up at a point ahead of the reactor 10 from: (1) make-up phenol and (2) $C_4$ hydrocarbon stream containing isobutylene from line 2; (3) recycled phenol from line 49; and (4) the reaction stream comprising phenol, reactive $C_4$ mixed hydrocarbons e.g., isobutylene, butene-1, trans-butene-2, cis-butene-2, butadiene, methyl acetylene and saturated and unsaturated hydrocarbon diluents e.g., methane, ethane, propane, o- and p-tert-butyl phenol, 2,4-dibutyl phenol and 2,4,6-tributyl phenol recirculating in loop 14. These four streams are blended in such proportions as will maintain a constant feed composition with respect to all components entering the process and also the desired balance of concentrations between the tert-butyl phenols and reaction by-products. The sum concentrations of 2,4-dibutyl phenol and 2,4,6-tributyl phenol is preferably maintained at a process equilibrium value of between 25 and about 50 weight percent of the feed to the reaction zone. Phenol to isobutylene molar ratios of from 0.25:1 to about 2:1 are essential to obtain the selective reactions described above. Ratios of from 0.5:1 to 1:1 are preferred under the conditions set forth below.

The intermixed streams forming the feed to the reaction zone are brought to a temperature of from 35 to 120° C. preferably from 50 to 75° C. and placed under sufficient pressure to liquefy the isobutylene, generally about 150–165 pounds per square inch gauge at the preferred temperatures given above, and maintained at this temperature and pressure in line 4 leading to the reaction zone. In general, higher operating temperatures should be coupled with the lower catalyst factors to insure no more than 95% of the isobutylene in the gas feed stream is reacted with phenol.

The reaction zone, reactor 10 is identical with that used with pure olefin feed streams.

The feed passes from line 4 through heat exchanger 20 to the top of reactor 10 at a rate of flow such that an "average catalyst factor" as defined above is from 0.06 to 1.0 pound hour per pound or more, preferably about 0.10 to 0.24 pound hour per pound which when operating at 55–60° C. and 150–165 p.s.i.g. will convert a maximum of 95% of the isobutylene of a $C_4$ hydrocarbon stream to a mixture of butyl phenols, and simultaneously react only 5% or less of the other components of the $C_4$ hydrocarbon stream. As explained above the phenol-isobutylene reaction is highly exothermic. The heat of alkylation is removed from the reaction zone by passing the super-heated reaction stream coming from the reactor 10 as an effluent through line 11 to circulating pump 12 and into circulation loop 14 where the effluent is moved at a great rate to heat exchanger 20 for blending with fresh phenol and mixed gas stream and recycled by-products and recycled phenol and wherein heat is removed from the recirculating stream and whence the stream is returned to reactor 10. The rate of recirculation in loop 14 is widely variable and depends upon the quantity of heat needed to be removed from the reaction stream to maintain a desirable temperature increment in the reaction zone. Generally speaking, a recirculation rate which permits less than a 20° C. rise in reaction stream temperature from the top to the outlet of reactor 10, e.g. from 20 to 40 times the feed rate, is perferred. Particularly preferred are recirculation rates which control the rise in temperature of the reaction stream to about 5° C. to 10° C. This latter and preferred increment of temperature rise is achieved when operating with 55–60° C. feed at about 150–165 p.s.i.g. of phenol and isobutylene containing $C_4$ hydrocarbon stream in a molar ratio of 1.0:1.0 by recirculating at a rate approximately 30–35 times the feed rate when the average catalyst factor is 0.24 pound hour per pound.

A portion of the recirculating reaction stream equivalent in volume to the feed of fresh phenol and $C_4$ gas stream and recycled phenol is withdrawn from the recirculation loop through line 15 and is passed to pressure reducing means, e.g. valve 16 in line 15 or a fractionating column where the pressure on the withdrawn portion is lowered to a level sufficient to evaporate substantially all the unreacted reactive components and the inert diluents of the mixed $C_4$ hydrocarbon stream, usually atmospheric pressure is sufficient, then through line 17 to separator 18 wherein a liquid-gas separation is effected. Separator 18 can be an open container wherein the unreacted components of the mixed hydrocarbon stream and the alkylated arylhydroxide are disengaged into separate streams. The alkylation products and unreacted and inert mixed hydrocarbon stream components are separated and the latter are sent for further processing, e.g. to remove the n-butene fraction of a $C_4$ hydrocarbon stream or for hydrocarbon cracking. The unreacted portion of the hydrocarbon stream is vented out of the system through line 27. The alkylation products are passed from the separator 18 along line 9 to pump 8 and then along line 21 to heat exchanger 22 to be heated prior to being introduced into the second stage reaction zone. The composition of the portion passed from the separator 18 is a mixture of para-tert-butyl-phenol products, isomeric and other butyl phenol by-products, and reactants. Specifically the composition of the portion will generally be para-tert-butyl phenol, ortho-tert-butyl phenol, phenol per se, dibutyl phenol and a quantity of tributyl phenol and other unidentified alkylation and some polymerization product. Prior to being passed into the heat exchanger 22 material from the product isolation and separation steps comprising mainly tert-butyl phenols other than para-tert-butyl phenol is recycled through line 59 into portion of the product stream withdrawn from separator 18 to form a product mixture. The product mixture is passed through line 21 to heat exchanger 22 to increase the temperature to where formation of the para-tert-butyl phenol isomer is favored. Generally, this will be a temperature of between about 100° C. to 140° C. and preferably 115° C. to 125° C. The heated mixture passes out of the heat exchanger 22 along line 23. This product mixture need not be maintained under superatmospheric pressure in the second stage reaction zone.

The rearrangement or conversion of the alkylation reaction products to predominantly para-tert-butyl phenol is carried out in excess phenol, preferably a 30–40% excess over reacted isobutylene content in a second stage reaction zone, reactor 30, identical to that used in the previously described embodiment of the process mixture.

Unlike the reaction utilizing pure olefin feed the alkylation reaction started in primary stage reactor 10 cannot be continued and completed in second stage reactor 30, because during the gas separation step at 18 any unreacted isobutylene is vented off.

In the second stage reactor 30, a rearrangement is achieved. The butyl phenols are substantially completely converted to para-tert-butyl phenol.

The second stage reactor effluent contains on a phenol free basis about 90 percent and preferably 95 percent and above of para-tert-butyl phenol, and small amounts of dibutyl phenol and ortho-tert-butyl phenol and traces of other alkylation and polymerization products.

The alkylation and conversion reactions proceed according to the scheme given above.

From this point, the description applies to both the pure and impure olefin source embodiments of the invention.

From the second stage reactor 30 the solution consisting primarily of para-tert-butyl phenol, some by-products and phenol per se is passed along line 31 to the middle of distillation column 40 which has a reboiler 42 connected thereto by loop 48 to maintain a bottoms temperature of about 150–160° C.

The overhead from distillation column 40 consisting of mainly phenol and by-products is drawn at a temperature of about 120° C. from the distillation column 40 under reduced pressures, suitably of about 100 mm. Hg in line 45 through line 43 into condenser 44. Therein the overhead is cooled and a part is passed through line 46 into line 47 and recirculated back to the distillation column 40 and the other part comprising mainly phenol with a trace of ortho-tert-butyl phenol is passed into line 49 and recycled back to the make-up phenol line 2 or 3.

The bottoms from distillation column 40 consisting largely of para-tert-butyl phenol with small quantities of the ortho isomer, dibutyl phenol and tar products as contaminants is passed to a second distillation column 50 wherein the purity of the product is increased by another distillation. The bottoms from the first distillation column 40 are fed along line 41 to the middle of second distillation column 50 which has a reboiler 52 connected thereto by loop 58 to maintain a lower bottoms temperature than that in first distillation column 40, i.e., about 145° C.

The overhead from the second distillation column 50 consisting of about equal amounts of ortho- and para-tert-butyl phenol is drawn at a temperature of about 125° C. from the distillation column 50 under further reduced pressures, suitably of about 40 mm. Hg in line 55 through line 53 into condenser 54. Therein the overhead is cooled and passed from the condenser 54 through line 56. A major portion is recirculated to the second distillation column 50 through line 57 and a minor fraction is recycled to the feed to the conversion zone through line 59.

The bottoms from second distillation column 50 comprising substantially para-tert-butyl phenol and very small quantities of the ortho isomer, dibutyl phenol and tar products as contaminants is passed to a third distillation column 60 wherein the para-tert-butyl phenol purity is increased to levels of 95% and higher. The bottoms from the second distillation column 50 are fed along line 51 to the middle of third distillation column 60 which has a reboiler 62 connected thereto by loop 68 to maintain a higher bottoms temperature than that in either column 40 or 50, i.e., about 160° to 170° C.

The overhead from the third distillation column 60 consisting of extremely high purity para-tert-butyl phenol, i.e., 95%, and less than 5% together of the ortho isomer and dibutyl phenol is drawn at a temperature of about 145° C. from third distillation column 60 under reduced pressure, i.e. about 40 mm. Hg in line 65 through line 63 into condenser 64. Therein the overhead is cooled, and after passing through line 66 approximately half is recirculated to the third distillation column 60 through line 67 and the other half is passed along line 69 to a cooling zone comprising a chilling means 70, preferably a flaker. Thereafter the crystallized para-tert-butyl phenol is removed as a product through line 71.

The bottoms from third distillation column 60 are passed along line 61 to a tar removal evaporation zone wherein the bottoms, consisting of para-tert-butyl phenol, dibutyl phenol and tar are circulated by pump 82 through loop 83 and through heat exchanger 84 and separator 80 maintained at about 150° C. and 40 mm. of Hg pressure in line 85. The overhead from the separator 80 is passed along line 87 to condenser 86 and the condensed overhead is recycled back toward the second stage reaction zone along line 89 to line 59 then to second stage reactor 30.

The bottoms from separator 80 consisting primarily of tar products including some polymerization products when a mixed hydrocarbon stream is used as the olefin source, with very small quantities of para-tert-butyl phenol and dibutyl phenol in line 88 are partly recirculated through line 89 to pump 82 and partly withdrawn from the system through line 91.

The advantages of process efficiency and product purity of our process are clearly shown by the following examples which are merely illustrative of the practice of our invention and are not to be construed as limitative thereof.

All parts and percentages are by weight.

EXAMPLE 1

A feed of 3.3 pounds per hour of phenol and 1.4 pounds per hour of liquefied isobutylene (99% pure) was premixed at 90° C. and 100 pounds/square inch gauge.

This feed was continuously metered to a reactor consisting of a stainless steel tube 1.25' x 1.5" ID packed with one pound of Dowex 50–X–4 cation exchanging resin which had been converted to the acid (H+) form and rendered anhydrous, i.e., less than 5% water by weight by soaking in phenol. The feed rate yielded an average catalyst factor of 0.15 pound hour per pound.

The reaction stream was recirculated by a 0.2 gallon/minute pump at a rate sufficient to control the temperature increment from inlet to outlet of the reactor to 10° C., i.e., 90° C. at inlet and 100° C. at outlet. Heat was removed by pumping the reaction stream through a 2.4 square feet single pass heat exchanger supplied with coolant.

A portion of the recirculating reaction stream equal in volume to the feed was withdrawn and passed to a heat exchanger which raised the temperature to 120° C. after which the withdrawn portion was introduced into a second stage reactor.

The second stage reactor consisted of a stainless steel jacketed tube 6′ x 2″ ID packed with eight pounds of the same catalyst as the first stage reactor. The rate of feed to the second stage reactor resulted in a 1.0 pound hour per pound average catalyst factor.

The effluents from both the primary and second stage reactors were analyzed by vapor phase chromatography and the results are given in Table I below.

TABLE I

| | Primary Stage Reactor Effluent, Percent | Second Stage Reactor Effluent, Percent |
|---|---|---|
| Isobutylene | 0.19 | 0.07 |
| Phenol | 30.17 | 22.16 |
| Para-t-butylphenol | 33.92 | 75.30 |
| Ortho-t-butylphenol | 10.19 | 1.62 |
| 2,4-dibutylphenol | 23.71 | 0.84 |
| 2,4,6-tributylphenol | 0.41 | |

The virtually complete reaction of isobutylene with phenol to tert-butylphenols is shown by the only 0.19% of isobutylene appearing in the effluent. The conversion reaction almost completely converts the butyl phenols to para-tert-butyl phenol as can be seen from the data above.

EXAMPLES 2–5

Example 1 was duplicated in procedure, in the same equipment and with the identical catalyst, except that the molar ratio of phenol to isobutylene was varied. The second stage reactor effluent was analyzed only in Example 4. Results are summarized in Table II below:

TABLE II

| | Example | | | |
|---|---|---|---|---|
| | 2 | 3 | 4 | 5 |
| Molar Ratio Phenol/Isobutylene | 0.65 | 0.85 | 1.3 | 1.85 |
| Primary Stage Reactor Effluent: | | | | |
| Isobutylene | 1.9 | 2.0 | 0.2 | 0.2 |
| Phenol | 7.3 | 12.0 | 28.1 | 43.0 |
| Para-t-butylphenol | 21.0 | 36.0 | 36.8 | 33.0 |
| Ortho-t-butylphenol | 3.3 | 3.2 | 9.2 | 7.0 |
| 2,4-dibutylphenol | 60.0 | 42.0 | 25.4 | 16.0 |
| 2,4,6-tributylphenol | 5.0 | 2.2 | 0.9 | 0.4 |
| Second Stage Reactor Effluent: | | | | |
| Isobutylene | | | | |
| Phenol | | | 17.0 | |
| Para-t-butylphenol | | | 75.3 | |
| Ortho-t-butylphenol | | | 1.0 | |
| 2,4-dibutylphenol | | | 6.6 | |
| 2,4,6-tributylphenol | | | <0.1 | |

EXAMPLE 6

Reaction of phenol and nonene

The equipment, catalyst and procedure of Examples 1–5 were used except that substantially atmospheric pressure was used, i.e., less than 1.1 atmospheres and just enough to keep the reactors hydraulically full. The inlet temperature was raised to about 100° C. and the temperature increment from inlet to outlet of the primary stage reactor was maintained at about 5° C.

The reactants were phenol and commercial nonene in a 2:1 molar ratio. The feed rate was 4.8 pounds per hour. Approximately 75% of the nonene was reacted at the end of the primary stage reaction and at least 95% at the second stage reaction with an overall average catalyst factor in both reactors of about 1.15 pound hours per pound or the same as the phenol-isobutylene reaction. The product, on a phenol-free basis was approximately 90% nonyl phenol and 10% dinonyl phenol. This latter portion of the product can be converted in another conversion stage as with dibutyl phenol.

EXAMPLE 7

Reaction of phenol and commercial diisobutylene

Example 6 was followed except that a 4.7 pound per hour feed rate was used and a temperature increment of 10° C. (101–111° C.) was permitted in the primary stage reactor. Analysis of the primary stage reactor by fractional distillation showed a 95% conversion of diisobutylene and an 85–90% octylphenol product, on a phenol free basis.

EXAMPLE 8

Reaction of phenol and commercial triisobutylene

Example 7 was followed except that a 4.3 pound per hour feed rate was used and a temperature rise of 3° C. was allowed across the primary stage reactor (103 inlet, 106° C. outlet). Overall average catalyst factor in both the reactors was 1.15 pound hours per pound. Samples of the effluent from the primary stage reactor and the second stage reactor were analyzed by fractional distillation and showed a 55% conversion of triiosbutylene at the end of the first reaction step and an 85% conversion after the second stage reaction step. The product was 85–90% dodecylphenol, on a phenol-free basis.

EXAMPLE 9

A feed of 1.0 pound per hour of phenol and 4.0 pounds per hour of a liquefied $C_4$ mixed hydrocarbon stream (0.5:1 phenol:isobutylene molar ratio) was pre-mixed at 55° C. and 155 pounds/square inch gauge pressure.

This feed was continuously metered to a reactor consisting of a stainless steel tube 2′ x 2.5″ ID packed with two pounds of Dowex 50-X-4 cation exchanging resin which had been converted to the acid ($H^+$) form and rendered anhydrous, i.e., less than 5% water by weight by soaking in phenol. The feed rate yielded an average catalyst factor of 0.24 pound hour per pound.

The reaction stream was recirculated by a 0.3 gallon/minute pump at a rate sufficient to control the temperature increment from inlet to outlet of the reactor to 2° C. i.e., 55° C. at inlet and 57° C. at outlet. Heat was removed by pumping the reaction stream through a 4.3 square feet single pass heat exchanger supplied with coolant.

A portion of the recirculating reaction stream equal in volume to the feed was withdrawn, the pressure thereon was reduced to atmospheric and the portion was passed to a 1.5′ x 10″ cylinder wherein the unreacted $C_4$ stream components were evaporated. After removal of unreacted reactive and inert diluents the separated product stream was introduced into a heat exchanger which raised the temperature to 120° C. after which the withdrawn portion was introduced into a second stage reactor.

The second stage reactor consisted of a stainless steel jacketed tube 2′ x 1.5″ ID packed with about one pound of the same type catalyst as the first stage reactor. The rate of feed to the second stage reactor resulted in a 0.96 pound hour per pound average catalyst factor.

The alkylate effluents were analyzed by vapor phase chromatography after the first and second stage reactions. Results are summarized in Table III.

TABLE III

| Component | Alkylate First Stage Effluent Wt. Percent | Alkylate Second Stage Effluent Wt. Percent |
|---|---|---|
| Phenol | 9.3 | 26.4 |
| Unknown | 10.6 | |
| Do | 0.7 | 0.2 |
| Do | 12.9 | |
| Do | | (¹) |
| Do | | 0.2 |
| Ortho-t-butylphenol | 5.7 | 3.0 |
| Para-t-butylphenol | 4.9 | 45.7 |
| Unknown | 6.7 | |
| 2,6-di-t-butylphenol | 0.7 | |
| Unknown | (¹) | |
| Do | | 0.1 |
| 2,4-di-t-butylphenol | 26.9 | 4.5 |
| 2,4,6-tri-t-butylphenol | 8.8 | 0.2 |
| Residue | 12.8 | 19.7 |

¹ Trace.

The rearrangement reaction in the second stage reaction zone was effected in the presence of 40% excess of phenol over isobutylene. This reaction resulted in side reactions wherein many of the unknown impurities, various components of the $C_4$ hydrocarbon stream, formed either additional residue or p-tert-butyl phenol product.

Approximately (80%) of the isobutylene present in the $C_4$ mixed hydrocarbon stream was reacted in this run as shown by a comparison of data taken by mass spectrography of the $C_4$ stream entering the reaction and the off-gas vented from the separation zone.

Data are given in Table III-A.

TABLE III-A

| Component | Gas Feed (Mole Percent) | Off-Gas (Mole Percent) |
|---|---|---|
| Methane | 0.9 | |
| Ethane | 1.1 | |
| Propylene | 2.0 | 3.2 |
| Propane | 4.9 | 3.7 |
| Methyl acetylene | 4.5 | 2.0 |
| Butanes | 27.7 | 43.8 |
| Isobutylene | 31.0 | 9.9 |
| Butenes | 21.9 | 29.4 |
| Butadiene | 6.0 | 7.1 |
| Octene | | 0.3 |
| Phenol | | 0.6 |

EXAMPLE 10

Example 9 was repeated except that the molar ratio of phenol to isobutylene was adjusted to 1.0:1.0. Also a different $C_4$ hydrocarbon stream from a different cracked hydrocarbon source was used.

The alkylate effluents were analyzed after the first and second stage reactions as in Example 9. Results are summarized in Table IV.

TABLE IV

| Component | First Stage Alkylate Effluent (wt. percent) | Second Stage Alkylate Effluent (wt. percent) |
|---|---|---|
| Unknown | 0.1 | |
| Do | 0.2 | 0.2 |
| Do | (¹) | 0.1 |
| Phenol | 25.0 | 25.8 |
| Unknown | 5.7 | |
| Do | 0.7 | |
| Do | | (¹) |
| Do | (¹) | (¹) |
| Do | (¹) | 0.1 |
| Do | (¹) | 0.3 |
| Ortho-t-butylphenol | 14.5 | 2.31 |
| Para-t-butylphenol | 10.5 | 65.20 |
| 2,6-di-t-butylphenol | 1.9 | |
| Unknown | 0.3 | |
| Do | 1.8 | |
| Do | | (¹) |
| Do | | (¹) |
| Do | | (¹) |
| 2,4-Di-t-butylphenol | 31.5 | 2.42 |
| Unknown | | 0.2 |
| 2,4,6-Tri-t-butylphenol | 4.3 | |
| Residue | 3.5 | 3.4 |

¹ Trace.

Again the feed $C_4$ stream and the off-gas were analyzed. Data are given in Table IV-A.

TABLE IV-A

| Component | Gas Feed (Mole percent) | Off-Gas (Mole percent) |
|---|---|---|
| Methane | | 0.5 |
| Ethane | 0.01 | 0.8 |
| Ethylene | 0.005 | |
| Carbon Dioxide and Propane | 1.4 | 2.6 |
| Propylene | 0.2 | 0.8 |
| Butenes | 22.7 | 36.3 |
| Isobutylene | 39.6 | 3.5 |
| Methyl Acetylene and Butadiene | 7.1 | 9.5 |
| Butenes | 28.9 | 46.6 |
| Phenol | | 0.1 |

What is claimed is:

1. Continuous process for the alkylation of phenols comprising the steps of
    (a) maintaining in a continuously recirculating reaction stream, a solvent-free liquefied mixture consisting essentially of phenol and a liquefied olefin having from 4 to 12 carbon atoms and a melting point of less than 150° C., at a temperature between 50° C. and 125° C., and in a molar ratio of from 0.5 to 10 moles of phenol per mole of olefin,
    (b) passing said mixture through a first reaction zone containing a stationary mass of substantially anhydrous cation exchanging resin containing strongly acidic exchanging groups in acid form and having a large surface, thereby alkylating only a portion of the phenol with at least a portion of said olefin,
    (c) and passing the resulting reaction mixture through a cooling zone to remove sufficient heat of reaction to keep the reaction temperature below 150° C.,
    (d) continuously feeding to said recirculating stream fresh phenol and olefin reactants in amounts such that the recirculation rate is from 2 to 50 times the reactants feed rate;
    (e) continuously withdrawing from said recirculating stream a portion thereof containing the alkylated phenol, said withdrawn portion being substantially equivalent to the volume of the feed, and
    (f) passing said withdrawn portion directly to a second reaction zone comprising a stationary mass of substantially anhydrous cation exchanging resin containing strongly acidic exchanging groups in acid form and having a large surface area while maintaining sufficient residence time in said second reaction zone to further react and convert the reaction stream to a higher concentration of the desired alkyl phenol;
    (g) distilling the effluent from said second reaction zone to remove unreacted phenol and reaction by-product isomers therefrom;
    (h) passing the reaction by-product isomers back to the reaction mass between said first and second reaction zones.

2. Continuous process claimed in claim 1 wherein the process is maintained at a system pressure between 1 and 15 atmospheres pressure.

3. Continuous process as claimed in claim 1 wherein the temperature increment between the inlet and outlet of the first reaction zone is less than about 20° C.

4. Continuous process as claimed in claim 1 wherein the olefin is isobutylene.

5. Continuous process as claimed in claim 4 wherein the isobutylene is in admixture with other saturated and unsaturated hydrocarbons.

6. Continuous process as claimed in claim 4 wherein the average catalyst factor in the first reactor is from about 0.06 to 1.0 pound of catalyst (dry weight) per pound per hour of reactants.

7. Continuous process as claimed in claim 4 wherein the average catalyst factor in the second reactor is from about 1 to 2 pounds of catalyst (dry weight) per pound per hour of reactants.

8. Continuous process as claimed in claim 4 wherein the cation exchanging resin is porous.

References Cited

UNITED STATES PATENTS

| | | | |
|---|---|---|---|
| 2,051,473 | 8/1936 | Evans et al. | 260—624 |
| 2,086,810 | 7/1937 | Langwell et al. | 260—624 |
| 2,107,060 | 2/1938 | Olin | 260—624 |
| 2,232,674 | 2/1941 | Pyzel. | |
| 2,371,550 | 3/1945 | Schoad | 260—624 |
| 2,578,597 | 12/1951 | Robinson | 260—624 |
| 3,049,569 | 8/1962 | Apel et al. | 260—619 |

FOREIGN PATENTS

| | | |
|---|---|---|
| 731,270 | 6/1955 | Great Britain. |
| 1,218,070 | 12/1959 | France. |
| 849,965 | 9/1960 | Great Britain. |

LEON ZITVER, *Primary Examiner.*

W. B. LONE, *Assistant Examiner.*